United States Patent [19]
Gravelle et al.

[11] Patent Number: 5,638,076
[45] Date of Patent: Jun. 10, 1997

[54] AUTOMATIC RANGE REDUCING GATING SYSTEM

[75] Inventors: Noel D. Gravelle, Riverside; Bennie D. Macomber, Norco, both of Calif.

[73] Assignee: The United States of America as represented by the Secretary of the Navy, Washington, D.C.

[21] Appl. No.: 583,499

[22] Filed: Sep. 29, 1966

[51] Int. Cl.⁶ ........................................................ G01S 13/00

[52] U.S. Cl. .............................................................. 342/94
[58] Field of Search ............................ 343/7, 7 PF; 342/94

*Primary Examiner*—Theodore M. Blum

[57] ABSTRACT

A target detecting device having a plurality of gate circuits for detecting the presence of sea return signals and reducing the effective target detecting range to a range less than the range to the sea surface which permits the detecting of true target signals.

3 Claims, 2 Drawing Sheets

AUTOMATIC RANGE REDUCING GATING SYSTEM

The invention herein described may be manufactured and used by or for the Government of the United States of America for governmental purposes without the payment of any royalties thereon or therefor.

The present invention relates to and is an improvement of our copending U.S. patent application for Range Sensing Target Detecting Device Ser. No. 583,497, filed 29 Sep. 1966.

There have been instances where reflections from sea waves have actuated target detecting circuits as if they were actually target reflected signals. The present invention provides a system which will sense the approach of the sea surface and automatically reduce the effective target detecting range of the fuze system, always maintaining this effective range less than the range to the sea surface thereby preventing warhead detonation by detection of surface return signals. The input to the system would be from the radar receiver consisting of a unipolar video pulse train which is the result of reflections from the surface of the sea. These pulses are applied as inputs to a plurality of target gates, a sea gate, and an amplitude detector.

The timing of the gates is such that all gates are turned ON coincident with the termination of the transmit pulse and each gate turns OFF in turn at times determined by the desired range cutoff of the particular gate. The purpose of the amplitude detector is to establish thresholds on an individual pulse basis to provide for sharp discrimination between ranges regardless of pulse amplitude. As the target detecting device carrier approaches the sea surface, signals reflected from the sea will first appear within the sea gate and be passed through the sea gate and into a first sea integrator circuit. The pulses fed into the first sea integrator circuit are summed and produce an output which will switch the output of target gate three from target count to a second sea integrator thereby preventing signals reflected from the sea passing through gate three and being counted as target signals. If the sea signals now appear in the output of target gate three threshold, the second sea integrator will produce an output which will switch the output of target gate two threshold away from target count. The integration time of the sea integrators is such that it is assured that the switching mentioned above takes place before the sea return signals appear in the gate to be switched. This sequence of operation can continue for as many range increments as there are range gates.

Accordingly, an object of the invention is to provide an automatic range reducing gating system which provides full sensitivity to targets at near ranges while preventing the signal return from the sea at a greater range from causing false warhead detonation even though the sea is within what would be the normal or high altitude fuzing range.

Other objects and many of the attendant advantages of this invention will become readily appreciated as the same becomes better understood by reference to the following detailed description when considered in connection with the accompanying drawings wherein.

Figure 1:
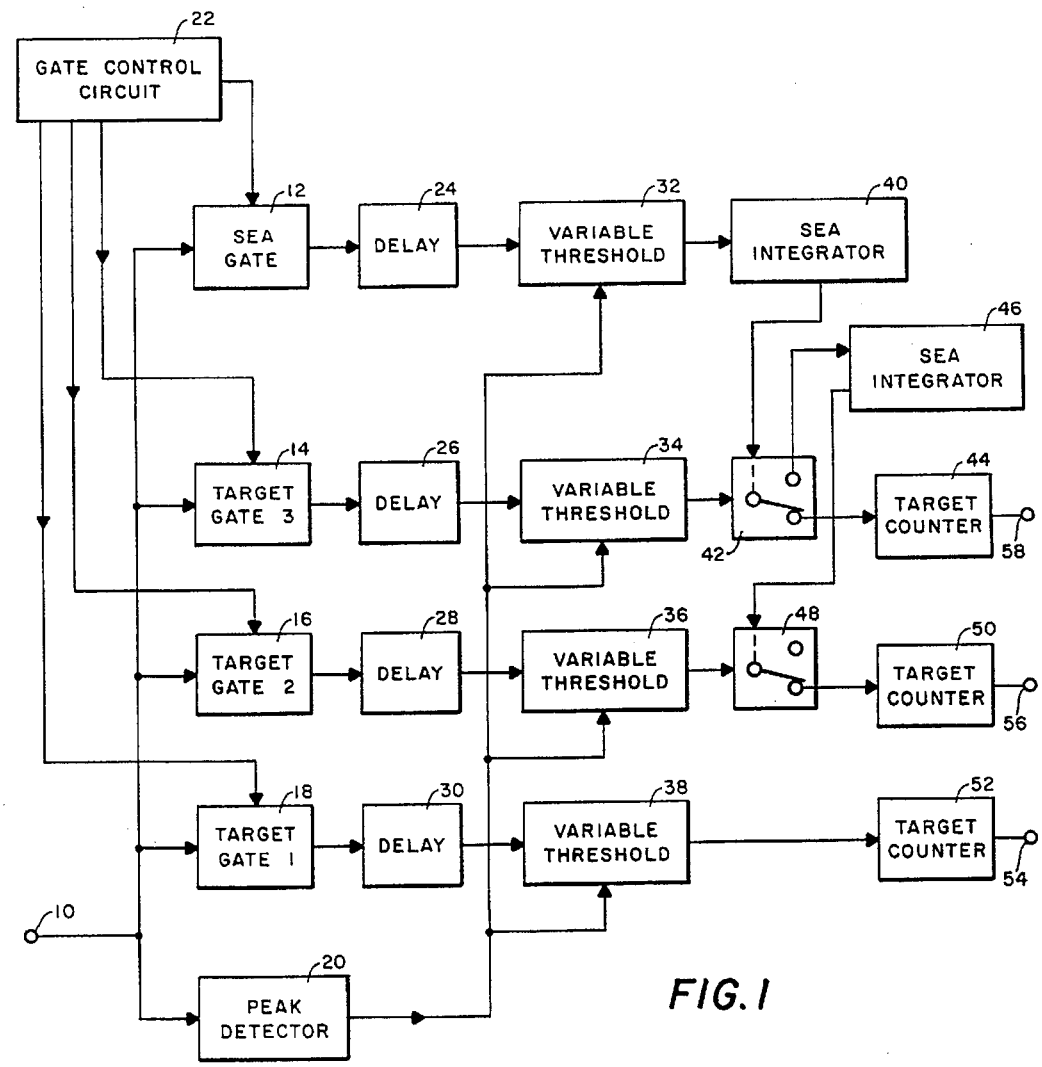
FIG. 1 is a block diagram of a preferred embodiment of the invention.
Figure 2:
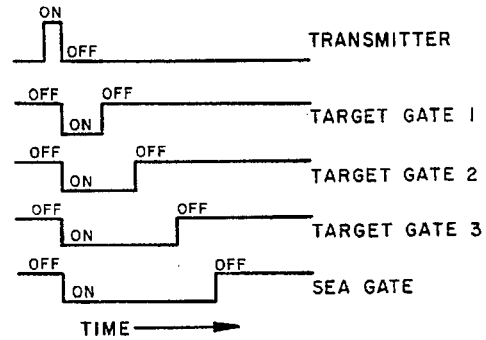
FIG. 2 is a system timing diagram of the invention.

As shown in FIG. 1, the reflected target signal is received at terminal 10 and fed to sea gate 12, target gates 14, 16, 18, and peak detector 20. Gates 12, 14, 16, and 18 are each controlled by a gate control circuit 22 (shown and described in our copending application, supra) which may be initiated by any suitable type timing device synchronized with the transmission of the radar pulse such as input signals from the radar modulator (not shown). The timing of the gates is such that all gates are turned ON coincident with the termination of the transmit pulse and each gate turns OFF in turn at times determined by the desired range cutoff of the particular gate. (See FIG. 2.) The signals passed by gates 12, 14, 16, and 18 are coupled through delay lines 24, 26, 28, and 30 to variable threshold circuits 32, 34, 36, and 38 respectively which will produce an output signal as determined by the output of peak detector 20. If there is an output signal at variable threshold circuit 32, it is fed to sea integrator 40 where it is summed to produce a switching signal. The switching signal out of sea integrator 40 is fed to electronic switch 42 which switches the output of variable threshold 34 from target counter 44 to sea integrator 46. If sea reflected signals then appear in the output of target gate 14, the signals will be fed to sea integrator 46. The output signal from sea integrator 46 is fed to electronic switch 48 which switches the output of variable threshold 36 away from target counter 50. If a target signal was passed by target gate 18, it would be counted by target counter 52 and produce an output signal at terminal 54. An output signal could appear at either of terminals 56 or 58 if target signals appear in target gate 16 or 14 prior to the switching of switches 48 or 42.

Figure 3:
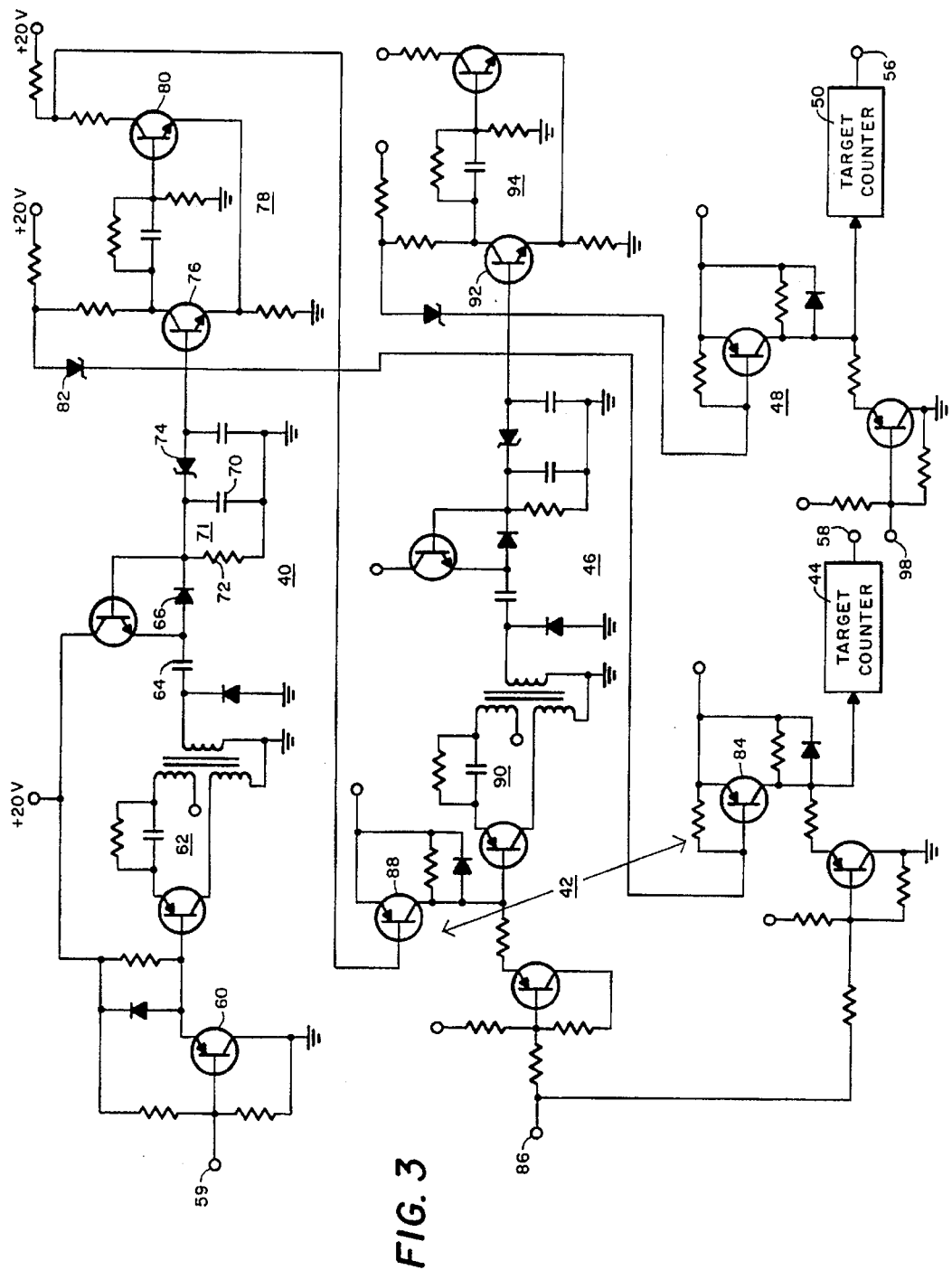
FIG. 3 is a schematic diagram of the embodiment of FIG. 1.

Referring now to FIG. 3 where there is shown in schematic diagram sea integrators 40 and 46 and electronic switches 42 and 48. The signal out of variable threshold 32 is coupled through an emitter follower 60 to a blocking oscillator 62. The output signals from blocking oscillator 62 are coupled through coupling capacitor 64 and diode 66 to an integrating circuit 71 consisting of capacitor 70 and resistor 72 which has a long time constant as compared to the time constant of the target counter circuits. If a pulse train persists at terminal 59 sufficiently long to charge capacitor 70 to the breakdown voltage of Zener diode 74, current flows through Zener diode 74 causing transistor 76 of a flip flop circuit 78 to conduct and transistor 80 to stop conducting. The conduction of transistor 76 causes a signal to be coupled through Zener diode 82, the base of transistor 84 which now conducts and blocks the output signal from variable threshold 34 at terminal 86 from entering target counter 44. In the absence of an output signal from transistor 80, transistor 88 stops conducting and permits the signal at terminal 86 to be fed to blocking oscillator 90 of sea integrator 46. The signal is processed in sea integrator 46 in the same manner as the signal is processed in sea integrator 40. An output signal from transistor 92 of flip-flop circuit 94 will cause transistor 96 of switch 48 to conduct and block the signal from variable threshold 36 at terminal 98 from being fed to target counter 50. Additional sea integrators may be added if desired.

Obviously many modifications and variations of the present invention are possible in the light of the above teachings. It is therefore to be understood that within the scope of the appended claims the invention may be practiced otherwise than as specifically described.

What is claimed is:

1. In an automatic range reducing gating system for detecting target signals in the presence of sea return signals, the combination comprising:

(a) a plurality of gating circuits for receiving target signals in the presence of sea return signals, (b) threshold-integrator-switch circuit means coupled to said plurality of gating circuits for rejecting sea return signals and permitting target signals to pass, (c) target counter means coupled to said circuit means for producing an output actuating pulse when a predetermined number of target signals are received within a predetermined time interval.

2. The range reducing system of claim 1 wherein said threshold-integrator-switch circuit means includes an amplitude detector to establish thresholds for passing signals on an individual pulse basis to provide for sharp discrimination between ranges regardless of pulse amplitude.

3. In an automatic range reducing gating system, the combination comprising:

(a) a plurality of target gate circuits and a sea gate circuit for receiving video signals reflected from a target, (b) gate control circuit means coupled to each of said target gate circuits and to said sea gate circuit for controlling the time interval each gate is open, (c) delay filter circuit means coupled to each of said target gate circuits and to said sea gate circuit for attenuating pulses having a pulse width less than a predetermined width, (d) peak detector circuit means for receiving and producing an output signal proportional to the received reflected video signals, (e) variable threshold circuit means coupled to said delay filter circuit means and to said peak detector circuit means for producing an output pulse when the amplitude of the signal from said delay filter circuit is greater than the amplitude of the output voltage of said peak detector, (f) first integrator circuit means coupled to the variable threshold circuit means that receives signals from said sea gate circuit for producing an output signal if more than a predetermined number of pulses are received within a predetermined time interval, (g) first switching means coupled to said first integrator circuit means and to one of said variable threshold circuit means which receives video signals from one of said target gate circuits having a gate width less than the gate width of said sea gate but greater than the gate widths of the remaining target gate circuits, (h) a second integrator circuit means having an input coupled to said first switching means and an output, (i) a first target counter circuit coupled to said first switching means, (j) said first switching means normally coupling the signal received from said one of said variable threshold circuit means to said first target counter circuit and being responsive to the output signal from said first integrator circuit means to switch the output of said one of said variable threshold circuit means to said second integrator circuit means, (k) second switching means coupled to said second integrator circuit means and to a second of said variable threshold circuit means which receives video signals from a second of said target gate circuits having a gate width less than the gate width of said one of said target gate circuits but greater than the gate width of the remaining target gate circuits, (l) a second target counter circuit coupled to said second switching means, (m) said second switching means normally coupling the signal received from said second of said variable threshold circuit means to said second target counter circuit and being responsive to the output from said second integrator circuit means to switch the output of said second of said variable threshold circuit means to an open circuit condition so that no signal will reach said second target counter.

* * * * *